Nov. 18, 1969 G. PEIS 3,479,044
DEVICE FOR HOLDING SKIS
Filed March 9, 1967 5 Sheets-Sheet 1

INVENTOR.
BY Gunter Peis
Kenon, Palmer, Stewart
& Estabrook

Nov. 18, 1969    G. PEIS    3,479,044
DEVICE FOR HOLDING SKIS
Filed March 9, 1967    5 Sheets-Sheet 2
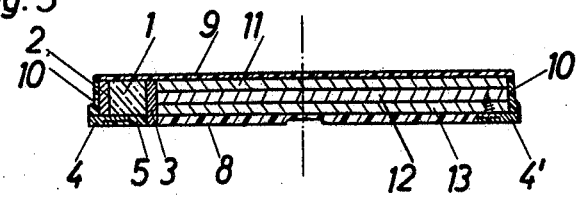
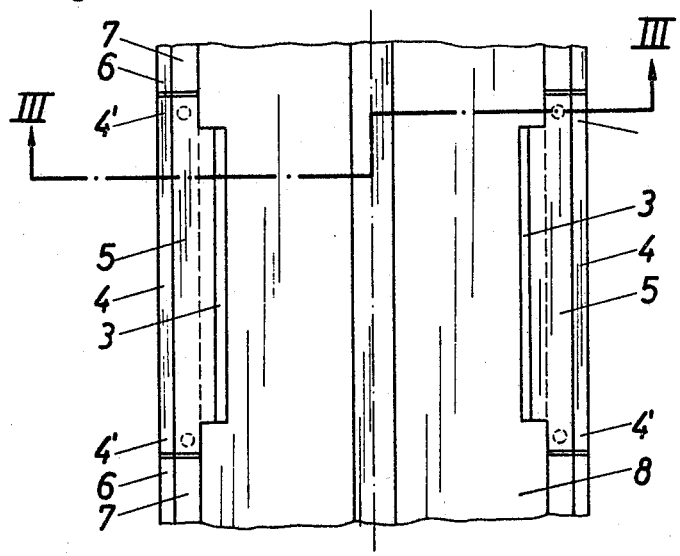
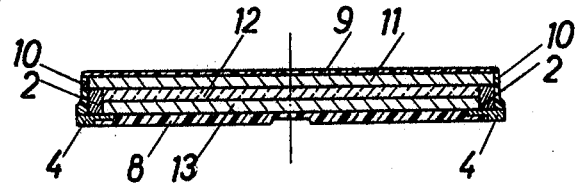
INVENTOR.
Gunter Peis
BY
Kenyon, Palmer, Stewart
& Estabrook Nov. 18, 1969  G. PEIS  3,479,044
DEVICE FOR HOLDING SKIS Filed March 9, 1967  5 Sheets-Sheet 3

INVENTOR.
Gunter Peis
BY
Kenson, Palmer, Stewart
& Estabrook

Nov. 18, 1969  G. PEIS  3,479,044
DEVICE FOR HOLDING SKIS
Filed March 9, 1967  5 Sheets-Sheet 4
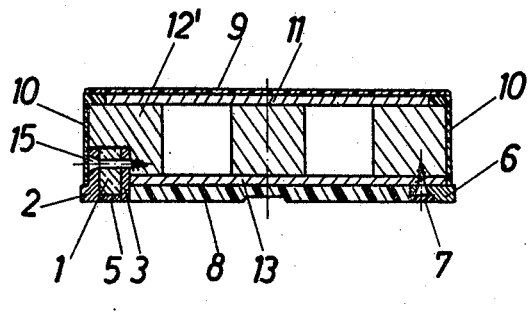
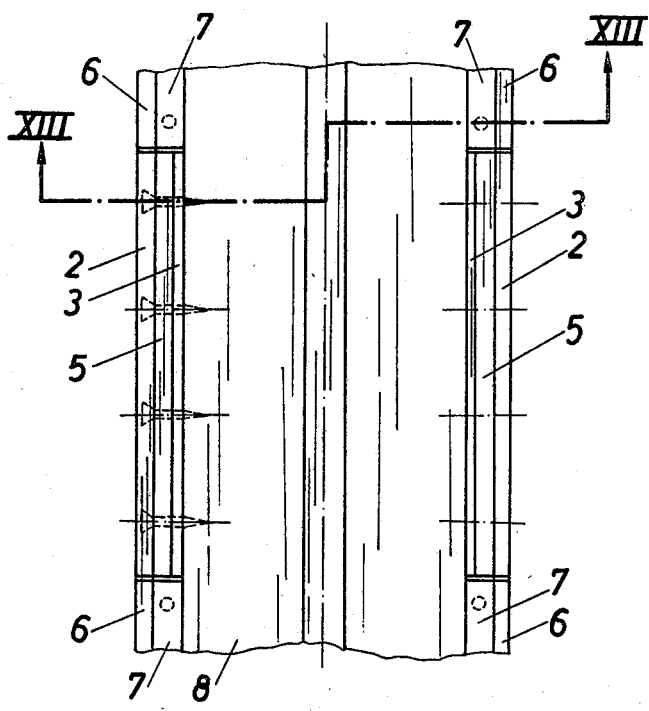
INVENTOR.
Gunter Peis
BY
Kenyon, Palmer, Stewart
& Estabrook Nov. 18, 1969  G. PEIS  3,479,044
DEVICE FOR HOLDING SKIS
Filed March 9, 1967  5 Sheets-Sheet 5
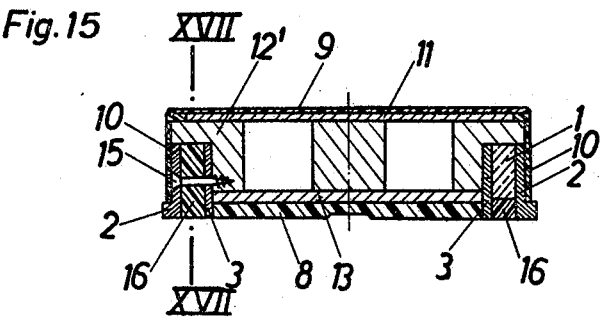
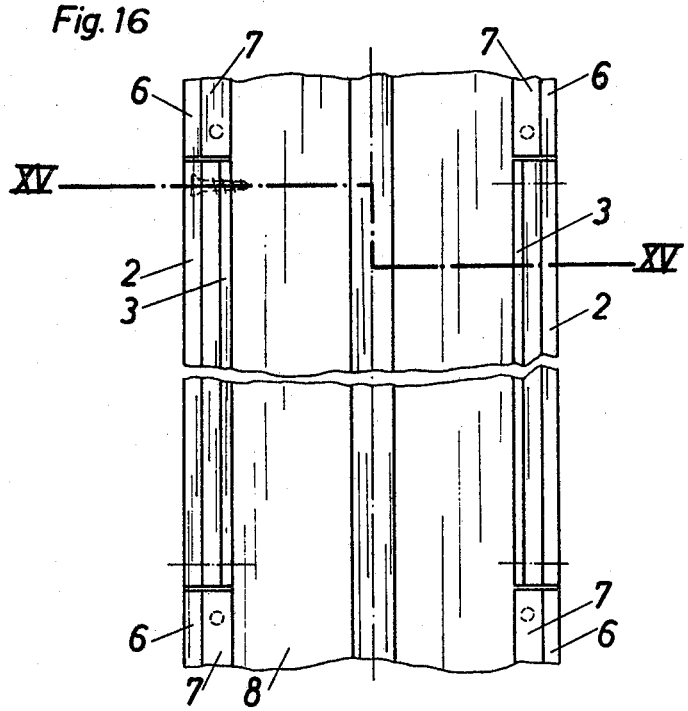
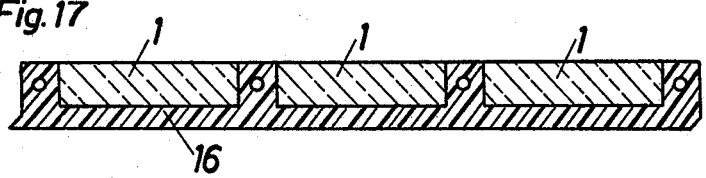
INVENTOR.
Gunter Peis
BY
Kenyon, Palmer, Stewart
& Estabrook United States Patent Office 3,479,044
Patented Nov. 18, 1969

3,479,044
DEVICE FOR HOLDING SKIS
Günter Peis, Richard-Wagner-Strasse 9,
Innsbruck, Austria
Filed Mar. 9, 1967, Ser. No. 621,922
Claims priority, application Austria, Mar. 14, 1966,
A 2,382/66; June 8, 1966, A 5,447/66; Sept. 26,
1966, A 8,976/66
Int. Cl. A63c 11/00, 11/02
U.S. Cl. 280—11.13
9 Claims

ABSTRACT OF THE DISCLOSURE

Skis are constructed with at least one permanent magnet fixed inside one ski and at least one ferromagnetic element fixed in the same zone of the other ski of the pair such that when the pair are placed together with their running surfaces face to face, the skis will hold together without the use of straps or other external holding devices.

---

This invention relates to a device for holding one ski to the other and/or to ski carriers, ski holders or the like.

Hitherto straps, tapes or the like have been used to hold single skis to ski carriers on vehicles.

In former times the toe straps of ski bindings were available for this purpose, but this possibility is eliminated with modern bindings. Long thongs and security straps are not always convenient; they are not in common use and new technical improvements will probably be substituted for them in the future.

In order to hold single skis to ski carriers as well as to associate them in pairs, particular devices are required which have hitherto usually been straps with various fastenings. It is known that such straps get easily lost and are torn after short use, in particular if they are made of rubber. Even in case of specially designed fastenings it is trouble-some to open and lock them. Besides, it is necessary to make the top side of the ski free of snow and ice before fastening the strap.

It is an object of the present invention to eliminate these disadvantages by the fact that at least in one of the two skis of a pair of skis one or more magnets are incorporated, there being at most a small distance between at least one portion of the pole face or at least one portion of the pole piece of at least one magnet and the running surface of the ski.

A convenient embodiment of this constructive solution consists in that at least one portion of the steel edges of the ski is a pole piece of the magnet or the magnets assembled inside the ski body, or that at least one portion of the steel edges are in contact with a pole piece of the magnet or the magnets.

In addition, the pole faces or pole pieces of the magnet or the magnets may also extend until the ski surface or closely to the ski surface or even over the ski surface, which may be particularly convenient, if the magnet or the magnets are incorporated in the binding zone of the ski. In this case the pole faces or pole pieces projecting to the ski surface may be utilized as the parts fixed on the ski of a magnet binding and may be formed correspondingly.

Embodiments of the invention and further features thereof are hereinafter described in greater detail with reference to the accompanying drawings, these embodiments being in no way limitative.

FIGURE 3 is a cross sectional view (on the line III—III of FIGURE 4) and FIGURE 4 is a top view of a part of the running surface, showing a magnet assembly in detail.

FIGURE 5 illustrates another magnet assembly in cross sectional view.

Figure 12:
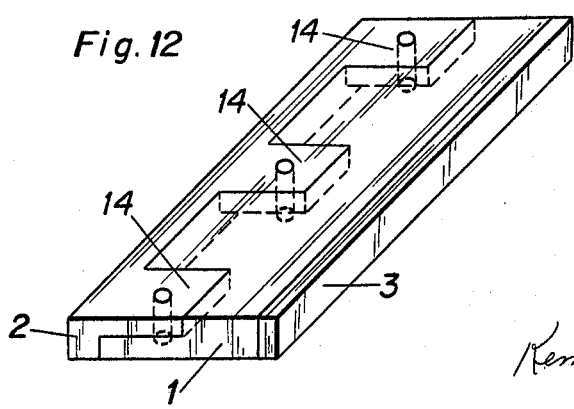
Figure 6:
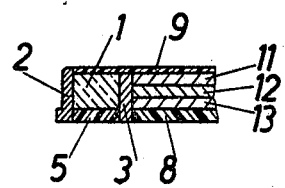
Figure 9:
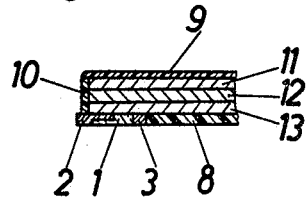
Figure 7:
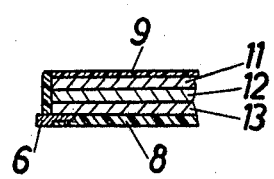
Figure 10:
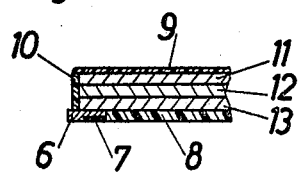
Figure 8:
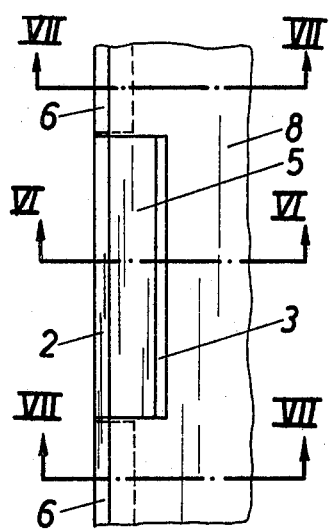
Figure 11:
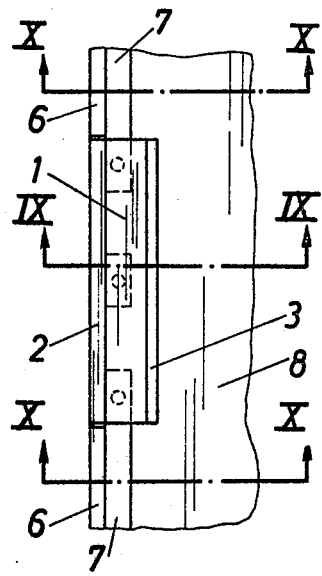

FIGURE 6 (on the line VI—VI of FIGURE 8) and FIGURE 7 (on the line VII—VII of FIGURE 8) illustrate another magnet assembly in cross sectional view and FIGURE 8 is a top view of a part of the running surface of this magnet assembly. Another magnet assembly is illustrated in FIGURE 9 in cross sectional view on the line XI—XI of FIGURE 11, in FIGURE 10 in cross sectional view on the line X—X of FIGURE 11, in FIGURE 11 in top view and in FIGURE 12 in a perspective view on an enlarged scale. FIGURE 13 illustrates another embodiment of the invention in cross sectional view of a part of the running surface of the ski, FIGURE 14 illustrates the same in top view.

A further embodiment of the invention is shown in FIGURE 15 in cross-sectional view on the line XV—XV of FIGURE 16, in FIGURE 16 in a top view of the ski running surface and in FIGURE 17 in section on the line XVII—XVII of FIGURE 15.

Figures 1, 2:
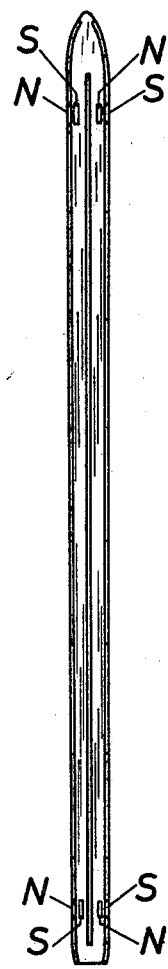
FIGURE 1 is a side view of a pair of skis held together and FIGURE 2 is a top view of the running surface of one of the two skis.

FIGURES 1 and 2 illustrate a pair of skis wherein in front and in the rear of each of the two skis permanent magnets 1 are incorporated, directly adjacent the shovel and the rear end curvature, the pole faces and pole pieces N (north) and S (South) being positioned in the ski running surface in the arrangement illustrated.

Various embodiments are described hereinafter with reference to the FIGURES 3 to 17, illustrating the way of giving the magnets a convenient form and of most suitably arranging them in the ski body.

According to the embodiments of FIGURES 3 and 4 the rod-shaped magnets 1 extend in side recesses of the ski body, the magnets being rimmed by the pole pieces 2, 3. The outer pole piece 2 is in contact with the edge portion 4 in such manner that the edge portion 4 is, so to say, an element of said pole piece. Between the pole piece 3 and the edge portion 4 a plastic coating strip 5 is disposed, which also hides the flat leg of the edge portion 4. The edge portion 4 is longer than the magnet 1 by the extensions 4'. The edge portion 4 is associated with the ski body by means of screws at these extensions 4', whereby the whole magnet assembly is secured to the ski by gluing, or other bonding agents.

In front and in the rear of the edge portion 4 the normal steel edges 6 of the ski with the plastic coating strips 7 are joined. The rest of the ski bottom side is made of the plastic coating 8. For the rest, FIGURE 3 also illustrates the following elements of the ski body: the top coating 9, the side coatings 10, the inner layers 11, 12, 13 of the ski body; in a known manner. In a wooden ski all three layers consist of wood, in a metal ski the layers 11 and 13 consist of the light metal and in a plastic ski the layers 12 and 13 consist of glass fiber reinforced plastic. In a metal or plastic ski, the layer 13 pertains to the core of the ski and consists of wood or another usual core material, but it may also be a metal intermediate plate in the shovel and in the rear end zone of the ski.

In the embodiment according to FIGURE 5 the magnet incorporated in the ski body has the form of a plate and is provided with two side rod-shaped pole pieces 2, which are in contact with the portion edges 4. The magnet plate 1, the pole pieces 2 and the edge portions 4 only extend over a relatively short portion of the ski length (as illustrated in the embodiment according to FIGURES 4, 5). Instead of a short edge portion 4 a steel edge extending over the whole length of the ski may be in contact with the pole pieces 2. The elements 8, 9, 10, 11 and 13 are as described with reference to FIGURES 4 and 5.

In the embodiment according to FIGURES 6 to 8 the magnet is again rod-shaped and incorporated in the side of the ski body. The outer pole piece 2 itself forms the ski edge and the side coating over the length of the ski corresponding to the length of the magnet. A plastic coating strip 5 is disposed between the inner pole piece 3 and the part of the outer pole piece 3 having the form of a ski edge. A corresponding magnet and pole piece assembly is provided at the opposite side of the ski, which is not shown. The other parts of the ski referred to by the numerals 6 and 8 to 13 are as described with reference to FIGURES 4, 5.

The embodiment according to FIGURES 9 to 12 shows a very flat magnet 1 comprising the pole pieces 2, 3, which only occupies the space of a normal edge portion and is positioned in only one recess of the running coating. The outer pole piece 2 has the form of an edge portion the splice strips 14 of which engage into corresponding recesses of the magnet 1. The splice strips 14 and the underlying parts of the magnet 1 are provided with holes for fixing screws in order to associate the magnet assembly with the ski body, the elements 1, 2, 3 of the magnet being associated to each other by gluing. The numerals 6 to 13 refer to the parts of the ski described with reference to the FIGURES 4, 5.

There is a variant of the embodiment according to FIGURES 6 to 8 and a variant of the embodiment according to FIGURES 9 to 12 like there is a variant according to FIGURE 5 which corresponds to the embodiment according to FIGURES 3 and 4. These variants consist in that the "inner" pole piece 3 is avoided and the magnet 1 extends like a plate between two "outer" pole pieces 2 extending in longitudinal direction of the ski in the two opposite external zones of the ski. In the case of the embodiment according to FIGURES 9 to 12 it is convenient to hide the magnet beneath by a thin protective film.

In the embodiment according to FIGURES 13 and 14 the magnet is again disposed in a side recess of the external zone of the ski body. The two pole pieces 2, 3 extending like ledges in longitudinal direction of the ski project along the running surface of the ski, the outer pole piece 2 being at the same time a portion of the ski edge. The breadth of the magnet assembly including the pole pieces is equal to the breadth of the adjacent usual portions of the steel edges 6 including the edge coating 7 thereof, so that the running coating 8 of the ski lying between the two side edge coating strips 6 does not require any recess at the places where the magnet assembly is provided. The magnet and pole piece assembly according to FIGURES 15 and 16 is screwed to the ski body by means of side screws 15 which consist of a non-ferromagnetic material since they cross the two pole pieces 2, 3 of different denomination. The above-directed leg of the outer pole piece 2 and the heads of the screws 15 are hidden by the side coating 10 of the ski. The magnet 1 is covered beneath between the pole pieces 2 and 3 by the plastic coating strip 5. The layers 11, 12' and 13 are of the importance described with reference to the FIGURE 13.

In the embodiment according to FIGURES 15 to 17, a magnet assembly consisting of the magnet 1 itself, an outer pole piece 2 and an inner pole piece 3 is disposed in each of the opposited side recesses of the ski body, i.e. in the middle zone of the longitudinally extending ski.

The construction of the ski body itself is not of importance for the invention, but in the embodiment described it consists of an upper supporting layer 11, e.g. of metal or glass fiber reinforced plastic, of a core layer consisting of blocks 12', e.g. of wood, and a lower supporting layer 13, e.g. of metal or glass fiber reinforced plastic. Besides, there are the steel edges 6 (L-shaped) including the plastic coating strip 7, the running coating 8, the top coating 9 and the side coating 10 made of plastic.

In the zone of the incorporated magnet assembly the lower part of the pole piece 2 makes the steel edge. Between the two pole pieces 2 and 3 an inset body 16 made of plastic is disposed which rims the magnet 1 or its portions like a frame at the front sides and on the bottom side turned to the running surface, the bottom side of the inset body being flush with the bottom edge of the pole pieces 2, 3.

A good association of the inset body 16 with the magnet assembly is possible by the parts of the inset body projecting above between the magnet portions 1 and at the front sides. The bottom surface of the inset body 16 in the form of a frame not only serves as a support for the magnet portions 1, but it is at the same time—as a gliding, water-repellent cover—a part of the running surface coating.

It is preferable to utilize a magnet 1 subdivided in portions rather than a longer continuous magnet since there is a danger of breaking the relatively brittle magnet material under dynamic stress and with low temperatures. This breaking danger is avoided by subdividing the magnet and by elastically embedding the portions into the inert body 16.

The magnet assembly may be fixed to the ski body by means of screws 15 of non-ferromagnetic or non-(ferro)-magnetizable material. The screws cross the above-projecting parts of the inset body 16, whereby the magnet itself is not pierced. Thus, screw pressure is absorbed by the above-projecting parts of the inset body 16. Thus, the inset body 16 is also important for the mounting of the magnet assembly.

The embodiments described illustrate the important case wherein a portion of the pole piece of a magnet lies in the ski running surface. However, it is possible that without any particular pole piece of steel or iron a portion of the magnet pole piece itself lies in the running surface of the ski or touches portions of the steel edges of the ski. This may be realized in such manner that the space of the pole pieces 2, 3 according to FIGURES 5 to 20 is occupied by correspondingly formed portions of the magnet made of a special magnet material.

If the magnets are strong enough, it is possible to hide the pole faces or pole piece faces, in particular of the inner pole pieces 3, e.g. by the running coating of the ski.

In order to associate one ski to the other according to the invention it is, in principle, sufficient to provide only one of the two skis with a magnet. The other ski must only be provided with magnetizable parts opposite to the magnet of the other ski, e.g. these parts possibly being the usual steel edges. As it is not convenient to distinguish between skis with and without magnets in manufacture, it is better to provide both skis of the pair with magnets; in this case attention must be given to the fact that, if the running surface of one ski lies on the running surface of the other, pole faces of different denomination are always opposite to each other.

What I claim is:

1. A pair of skis capable of being held together with their running surfaces face to face without use of straps or other external holding devices comprising a permanent magnet fixed inside the first of the skis with at least one pole of said magnet adjacent the running surface of said first ski and a permanent magnet comprising a steel edge of the second ski of said pair fixed in said second ski in such position that when the skis of the pair are placed together with their running surfaces face to face, said magnet of said second ski will at least partially overlay said magnet of the first ski.

2. A pair of skis as claimed in claim 1 wherein at least one ski has a magnet recessed in its side and the magnet is provided with an outer and an inner pole piece extending in the longitudinal direction of the ski, the outer pole piece being formed at least in part of the ski edge.

3. A pair of skis as claimed in claim 1 wherein said skis have plastic running layers forming the running surface of the skis, said magnet of said first ski has its permanent magnet piece inside the ski and at least one pole piece projecting at least partially through said running layer.

4. A pair of skis as claimed in claim 3 wherein said projecting pole piece is hidden by a coating of non-ferromagnetic material.

5. A pair of skis capable of being held together with their running surfaces face to face without use of straps or other external holding devices comprising a plurality of permanent magnets fixed inside the first of the skis, each such permanent magnet comprising (a) at least one piece of permanent magnetic material, and (b) a pole piece that comprises a steel edge of the ski and at least one ferromagnetic element fixed in the second ski of said pair in such position that when the skis of a pair are placed together with their running surfaces to face, said ferromagnetic element of the second ski will at least partially overlay said steel edge of the first ski.

6. A pair of skis as claimed in claim 5 wherein the ferromagnetic element of the second ski comprises a plurality of permanent magnets each comprising at least one piece of permanent magnetic material and a pole piece comprising a steel edge of said second ski so that when the pair of skis are in said face to face position, magnets of the first ski attract an overlaying steel edge pole piece of said second ski.

7. A pair of skis as claimed in claim 5 wherein said skis have a running layer forming the running surfaces of the skis and said magnets are flat magnets fixed within the ski directly beneath such running layer.

8. A pair of skis as claimed in claim 5 wherein the skis have steel edges, the ferromagnetic element of the second ski comprises a permanent magnet, each ski having at least one magnet recessed in the side of the ski, each said recessed magnet having an outer and an inner pole piece extending longitudinally of its ski, said outer pole piece being formed at least in part of a steel edge of the ski, and each ski having at least one insert of non-magnetic material disposed between said outer and inner pole piece, the bottom side of said insert being flush with the bottom edge of such pole pieces.

9. A pair of skis as claimed in claim 8 wherein said insert is made of plastic material.

References Cited

UNITED STATES PATENTS

| | | |
|---|---|---|
| 3,251,607 | 5/1966 | Wren. |
| 3,353,835 | 11/1967 | Sommer. |

FOREIGN PATENTS

| | | |
|---|---|---|
| 675,430 | 12/1963 | Canada. |
| 26,229 | 9/1915 | Norway. |
| 246,283 | 9/1947 | Switzerland. |
| 246,705 | 10/1947 | Switzerland. |

LEO FRIAGLIA, Primary Examiner

MILTON L. SMITH, Assistant Examiner